United States Patent [19]
Perkins

[11] 4,355,652
[45] Oct. 26, 1982

[54] PURGING DEVICE

[76] Inventor: Lawrence B. Perkins, 1616 Ninth St., Woodward, Okla. 73801

[21] Appl. No.: 170,512

[22] Filed: Jul. 21, 1980

[51] Int. Cl.³ .............................................. B08B 9/02
[52] U.S. Cl. ...................................... 137/15; 55/169; 55/219; 137/59; 137/240
[58] Field of Search ............... 137/166, 195, 202, 415, 137/59, 240, 1, 15; 55/169, 219; 237/80; 134/166 C

[56] References Cited

U.S. PATENT DOCUMENTS

| | | | |
|---|---|---|---|
| 1,988,769 | 1/1935 | Aldridge et al. | 137/59 |
| 2,064,962 | 12/1936 | Waters | 137/415 |
| 2,322,304 | 6/1943 | Montgomery | 137/415 |
| 2,664,170 | 12/1953 | Walker et al. | 137/415 |
| 2,842,156 | 7/1958 | Huneke | 137/415 |
| 2,995,201 | 8/1961 | Stafford et al. | 137/202 |
| 3,021,709 | 2/1962 | Walker et al. | 55/219 |
| 3,765,442 | 10/1973 | Nettles et al. | 55/219 |

Primary Examiner—George L. Walton
Attorney, Agent, or Firm—Christopher H. Morgan

[57] ABSTRACT

A device and method for purging a liquid carrying conduit with pressurized gas, the device having a reservoir for holding a quantity of gas which is connected to a supply of pressurized gas. The reservoir is also connected to the liquid carrying conduit. In response to a first signal, a first valve isolates the gas reservoir and the supply of pressurized gas and a second valve communicates the reservoir and the liquid carrying conduit. In response to a second signal the first valve communicates the reservoir and the supply of pressurized gas and the second valve isolates the reservoir and the liquid carrying conduit. The first signal can indicate when the liquid carrying conduit is carrying liquid and the second signal can indicate when the conduit can be purged. Preferably, this device can be attached to a gas well separator to prevent freezing of the pipe conveying liquid away from the separator.

12 Claims, 1 Drawing Figure

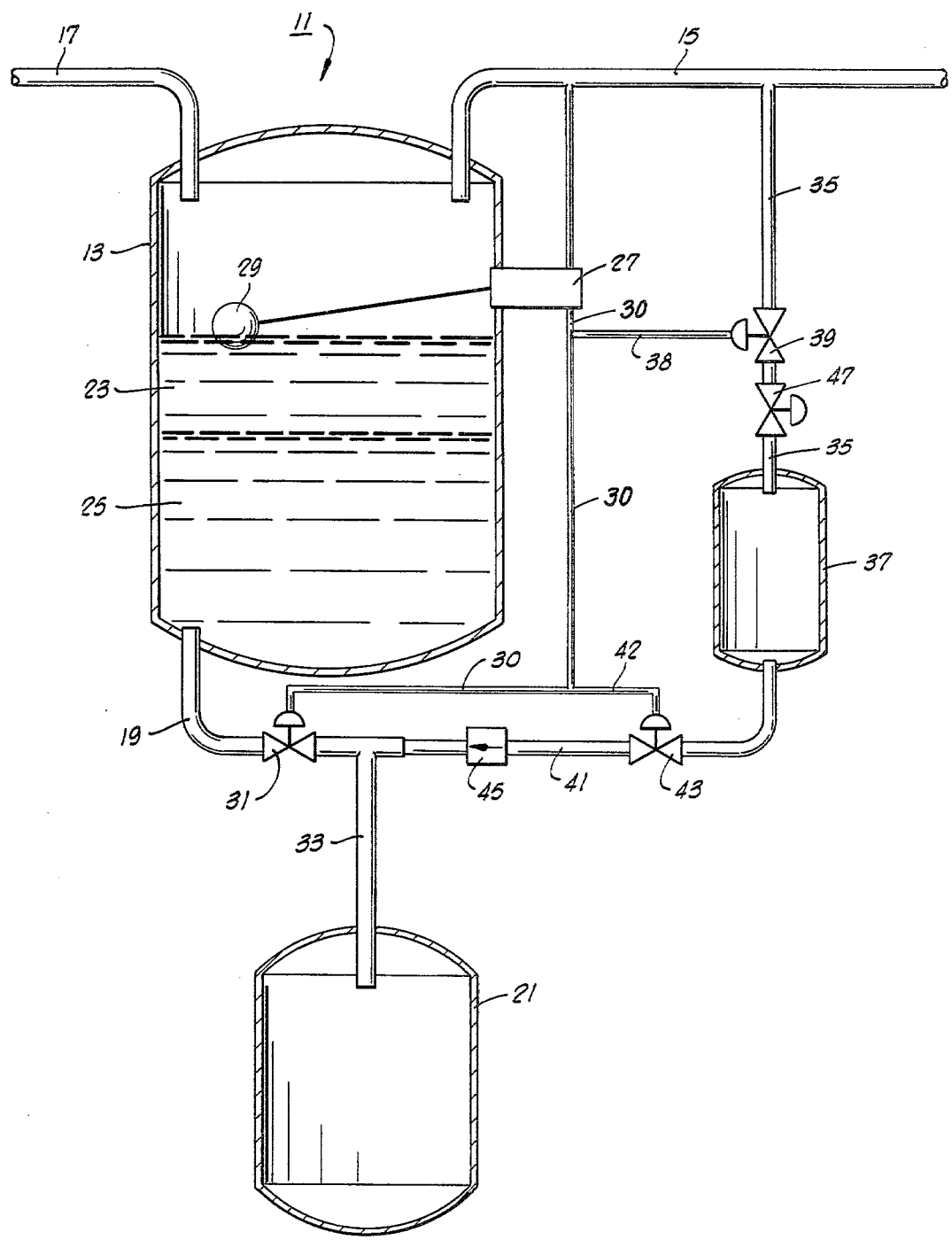

PURGING DEVICE

BACKGROUND OF THE INVENTION

1. Field of the Invention

This invention relates in general to devices for purging liquid carrying conduits and more particularly to methods and devices for purging liquid carrying conduits with pressurized gas.

2. Background of the Invention

In the past it has often been found necessary to purge liquid carrying conduits. For example, one way to prevent a liquid filled conduit from freezing when it is exposed to a cold environment is to purge the conduit with pressurized gas. One example of where such purging is required is in homes left untended in the winter having unprotected water plumbing. Another example is gas well separators and this environment is described in my presently pending application Ser. No. 103,843 entitled "Gas Regulation Device for Gas Actuated Valves" filed Dec. 14, 1979.

In a gas well environment, a separator is required to remove water and hydrocarbon liquids from the gas before the gas is pumped away from the well. Of course, because the liquid in the separator accumulates, liquid must occasionally be removed from the separator to a separate holding tank or the like. In the winter, the pipe connecting the separator and the holding tank is subject to freezing (even if this pipe is buried). Furthermore, a convenient source of power such as electricity is not available to heat the pipe. This lack of power also requires that any devices used on the separator or thereabouts be actuated by means other than electrical power.

The present gas well separators operate by using gas pressure to communicate with and power valves in the process of removing liquids from the holding tank. Specifically, a float valve is attached to the side of the separator to determine when the liquid level is such that liquid should be conducted to the holding tank. When the liquid level in the separator reaches a predetermined height, the float valve directs pressurized gas to a gas actuated valve on the pipe between the separator and the holding tank. This pressurized gas opens the valve and the pressure above the liquid in the separator causes the liquid to flow through the pipe into the holding tank. When the liquid level in the separator falls to a second height, the float valve causes the pressurized gas to the gas actuated valve to be vented to close the valve. This ends the dump cycle and the liquid level in the separator again rises.

As described above, a problem in the past has been that the dump line (the pipe between the separator and the holding tank) occasionally freezes in the winter since the liquid in this line is stagnant for significant periods of time between the dump cycles. One solution to this problem is shown in my pending patent application entitled "Gas Regulation Device for Gas Actuated Valves". Described therein is an apparatus and method for delaying the venting of the pressurized gas communicated by the float valve to the dump line valve which delay prevents the valve from closing until the liquid in the separator has been completely exhausted and gas in the separator purges the dump line of liquid. This is achieved by means of a bypass pipe on the gas actuation line between the float valve and the dump line valve. A check valve and an orifice delay the closing of the dump line valve for a predetermined time.

Even though the method and device described in pending application Ser. No. 103,843 entitled "Gas Regulation Device for Gas Actuated Valves" filed Dec. 14, 1979 prevents the dump line from freezing, it is sometimes desired that the liquid in the separator not be completely exhausted. For example, if the separator contains a significant amount of hydrocarbon liquids as well as water, these two liquid phases will separate and it is preferable not to dump the separated hydrocarbon liquids along with the water.

In the prior art in general, no method or device has been shown which can be used for periodically and regularly purging a liquid carrying conduit with a specific limited quantity of pressurized gas.

SUMMARY OF THE INVENTION

It is accordingly, an object of the present invention, to provide an improved device for purging a liquid filled conduit with pressurized gas. It is also an object of the present invention to provide an improved method for purging a liquid filled conduit with pressurized gas.

Another object is to provide such a device and method for improving a gas well separator.

Another object of this invention is to provide a device which can purge liquid from a conduit with a predetermined amount of pressurized gas. Preferably, this is done in a cyclical manner in response to a signal such as a gas pressure signal. The signal is preferably responsive to the condition of liquid in the conduit.

A further object of this invention is to provide a device which can be conveniently attached to an existing gas well separator to allow the separator to operate with a cyclical purging of the dump line such that the dump line will not freeze in cold weather.

Still another object of the present invention is to provide an improved device for purging liquid from a dump line of a gas well separator containing separate layers of liquid such as oil and water, which device can operate to purge the dump line of liquid without requiring the separator to be emptied or requiring the dumping of one of the liquid phases.

In accordance with these objects, the present invention has a reservoir for holding a quantity of pressurized gas. This reservoir is connected by a first conduit to a supply of pressurized gas. A second conduit connects the reservoir to a liquid carrying conduit. A first valve means is disposed along the first conduit for communicating and isolating the reservoir and the supply of pressurized gas. A second valve means is disposed along the second conduit for communicating and isolating the reservoir and the liquid carrying conduit. The first and second valve means are responsive to signals such that a first signal causes the first valve to isolate the reservoir and the supply of pressurized gas and causes the second valve to communicate the reservoir and the liquid carrying conduit. A second signal causes the first valve to communicate the reservoir and the supply of pressurized gas and causes the second valve to isolate the reservoir and the liquid carrying conduit. Finally, a means for altering the signals according to the condition of liquid in the liquid carrying conduit is provided.

In a gas well environment, the conduit with liquid to be purged is the dump line between the separator and the holding tank. Preferably, the signal provided is a gas pressure signal and each of the valve means are pressure actuated valves. The means for altering the signals according to the liquid state in the dump line is the float valve which also supplies gas pressure to the valve on the dump line.

The method of the present invention purges a liquid carrying conduit by filling a reservoir connected to a pressurized gas supply. The reservoir is then discharged into the liquid carrying conduit. The condition of liquid in the liquid carrying conduit determines the occurrence of the filling and discharging steps.

For a further understanding of the invention and further objects, features and advantages thereof, reference may now be had to the following description in conjunction with the accompanying drawings.

BRIEF DESCRIPTION OF THE DRAWINGS

The FIGURE is a schematic view of the present invention shown attached to a gas well separator depicted schematically in a cross sectional view.

DESCRIPTION OF THE PREFERRED EMBODIMENTS

Referring now to the FIGURE, the device of the present invention is shown attached to a gas well separator 11. The pipes, valves, etc., are shown schematically. The tanks are shown in schematic cross section.

Separator 11 comprises a separator tank 13 which receives gas and liquid from a gas well through a gas line or pipe 17. As the gas and liquid pass through separator tank 13, the liquid drops out and the dry gas passes out of tank 13 through a dry gas line 15. The liquid from separator tank 13 is periodically removed by way of a pipe 19 and a dump line 33. Pipe 19 opens into the lower portion of separator tank 13 so that liquid at the bottom of the tank 13 will pass into pipe 19. Pipe 19 is connected to dump line 33 which is, in turn, connected to a holding tank 21 which ultimately receives the liquid removed from the bottom of separator tank 13.

The liquid from the gas well which passes into the separator through pipe 17 frequently contains both water and oil. As the water and oil mixture drop out of the gas, the water begins to separate from the oil forming an oil layer 23 above a water layer 25. Normally, it is desirable to maintain this separation since the oil can be more readily sold or used in its separated state. Therefore, when the liquid is conveyed to the holding tank 21, it is desirable to convey only the water layer 25 in this process. A separate valve, not shown in the FIGURE, can be provided on separator 11 to draw off the oil layer 23 at desired intervals.

To regulate the amount of liquid which accumulates inside separator 11, a float valve mechanism 27 is attached to a float ball 29 to respond to this liquid level. The float mechanism 27 acts as a valve to control the flow of pressurized gas through a gas conduit 30. This conduit is connected at one end to dry gas pipe 15 which conducts the pressurized gas away from the separator. The other end of gas conduit 30 is connected to the actuation mechanism of gas actuated valve 31. Valve 31 controls the flow through dump line 33 and pipe 19 and therefore the flow of liquid from the separator 11 into the holding tank 21.

Gas actuated valves such as valve 31 are well known in the art. These valves can operate such that when pressurized gas is received in their actuating mechanisms the valve either opens or closes. Valve 31 preferably operates such that when gas pressure is applied through gas conduit 30 the valve snaps open. When the pressure drops sufficiently in gas conduit 30, valve 31 snaps closed.

Dump line 33 carries liquid from pipe 19 and valve 31 to holding tank 21. Normally line 33 is relatively much longer than depicted in the FIGURE because of the necessary distance between separator 11 and holding tank 21. Line 33 is often buried in the ground to help prevent this line from freezing during the winter. Nevertheless, this line occasionally does freeze causing a great deal of trouble.

Without the combination of the present invention, the separator 11 operates to cyclically remove the liquid from separator tank 13 to holding tank 21. As gas and liquid enter separator tank 13 through the gas well pipe 17, the liquid drops out and the liquid level in separator tank 13 rises. As described above, the liquid which drops out contains both oil and water and this oil and water separates into a water layer 23 and an oil layer 25. The float ball 29 rests on the liquid and indicates to the float mechanism 27 the height of the liquid in tank 13.

When the liquid level in tank 13 reaches a first predetermined height, the float ball 29 causes the float mechanism 27 to open its valve on gas conduit 30 such that gas pressure is supplied from the dry gas pipe 15 to the gas actuated valve 31. When the gas pressure in the actuation mechanism of valve 31 is sufficiently high, valve 31 springs open and liquid passes through pipe 19 and line 33 into holding tank 21. The liquid in separator 11 is urged through pipe 19 and line 33 by the pressure of the gas in tank 13 above the liquid. This gas pressure in the separator tank 13 is maintained by the pressure of the gas in the well.

After the valve 31 has been opened, the liquid level in separator tank 13 begins to fall. When the liquid level reaches a second predetermined level which is lower than the first predetermined level, float ball 29 causes the float mechanism 27 to close the valve on gas conduit 30 and to vent the gas from conduit 30 such that the gas pressure on the actuation mechanism of valve 31 is released. Valve 31 then springs closed to halt the float of liquid through pipe 19. The liquid level in separator tank 13 then rises again until the first predetermined level is attained and valve 31 is reopened.

The operation of the separator to cyclically remove liquid from separator tank 13 to holding tank 21 by means of the float mechanism 27 and the gas actuated valve 31, as described above, are old and well known in the art. The combination of the present invention with this separator allows line 33 to be cleared of liquid following each dump cycle. This is achieved without emptying the separator tank 13, remixing the oil layer 23 with the water layer 25, or unnecessarily wasting gas.

The combination of the present invention has a gas conduit 35 connected at one end to the dry gas pipe 15 and at the other end to a gas tank or reservoir 37. A valve 39 is disposed along conduit 35 to regulate the flow therethrough. Valve 39 is gas actuated and its actuation mechanism is attached to a gas conduit 38 which is in turn connected to gas conduit 30.

Gas reservoir 37 is connected to line 33 by a conduit 41. This connection is adjacent valve 31. A gas actuated valve 43 is disposed along conduit 41 to regulate the flow therethrough. A gas conduit 42 connects the actuation mechanism of valve 43 to gas conduit 30.

From the above description, it can be seen that valves 31, 39 and 43 are each connected to gas line 30 such that the supply of pressurized gas created and withdrawn by float mechanism 27 in response to the liquid level in separator tank 13 is communicated to each of the valve actuation mechanisms at approximately the same time. The actuation mechanism of valve 39, like that of valve 31, causes valve 39 to open in response to the gas pressure signal and to be closed in response to removal of this gas pressure. Valve 43, on the other hand, has a gas actuation mechanism which causes the valve to close in response to a gas pressure signal and to open in response to this gas pressure being removed. Therefore, when gas pressure is communicated through conduits 30, 38 and 42, valve 31 is opened, valve 39 is opened and valve 43 is closed. When gas pressure is removed from conduits 30, 38 and 42, valve 31 is closed, valve 39 is closed and valve 43 is opened.

A check valve 45 is disposed on pipe 41 adjacent to its connection to line 33. Valve 45 is disposed to prevent flow through pipe 41 toward valve 43 and reservoir 37 from line 33. Valve 45 is located adjacent pipe 33 and valve 31 to prevent liquid from pipe 33 from entering a significant portion of pipe 41.

A valve 47 is disposed on pipe 35 between valve 39 and reservoir 37 to allow the gas flow into reservoir 37 to be controlled independently of the opening and closing of valve 39. Valve 47 can be manually controlled to allow adjustment or cessation of the filling of reservoir 37.

In operation, the combination of the present invention cooperates with separator 11 and float mechanism 27 without altering the process of cyclically removing the liquid from separator tank 13 as described above. When gas conduit 30 is not charged with pressurized gas and valve 31 is closed such that liquid is accumulating in separator tank 13, conduits 38 and 42 are also not charged with pressurized gas such that valve 39 is closed and valve 43 is open.

When liquid accumulates in separator tank 13 such that float mechanism 27 charges the gas conduit 30, this also charges gas conduits 38 and 42. Thus, as valve 31 opens, valve 39 also opens and valve 43 closes. In this manner, while liquid from separator tank 13 moves through pipe 19 and dump line 33 into holding tank 21, reservoir 37 is filled with pressurized gas. At the same time, valve 39 is open to allow gas from dry gas pipe 15 to enter reservoir 37 and valve 43 is closed to prevent this gas from being communicated to pipe 33. Check valve 45 prevents liquid in line 33 from entering pipe 41.

When float ball 29 indicates to float mechanism 27 that the liquid in separator tank 13 has dropped sufficiently (before sufficient liquid has been exhausted to cause oil in oil layer 23 to enter pipe 19) the charging of pressurized gas to conduits 30, 38 and 42 is halted and this gas is vented. This relieves the gas pressure on the actuation mechanisms of valves 31, 39 and 43. Valves 31 and 39 are thereby closed and valve 43 is opened. The closure of valve 31 halts the flow of liquid from separator tank 13 into holding tank 21. At this time, pipe 33 is still filled with liquid which was in the process of being passed from separator tank 13 to holding tank 21. The closure of valve 39 halts the flow of pressurized gas into reservoir 37. The opening of valve 43 communicates the charge of gas in reservoir 37 to pipe 33. This gas purges the liquid in pipe 33 into holding tank 21.

Preferably, reservoir 37 is sized such that the pressurized gas in reservoir 37 will be just sufficient to purge the liquid in pipe 33 without expelling unnecessary gas into holding tank 21. This prevents gas from being wasted in the process of purging pipe 33.

After valve 31 is closed, liquid again begins to accumulate in separator tank 13. When the liquid has accumulated sufficiently, the cycle of transferring liquid from separator 11 to holding tank 21 will be repeated and pipe 33 will again be purged with gas from reservoir 37.

From the above description it can be seen that purging of liquid in dump line 33 by the process and equipment of the present invention prevents freezing of the liquid in line 33 during cold weather. Since liquid is present in pipe 33 only when the liquid is in motion, freezing is less likely. Also, since the filling of separator tank 13 takes significantly longer than the time for liquid to be passed from separator tank 13 to holding tank 21, pipe 33 is free of liquid for most of the time. Of course, the less time liquid is present in pipe 33, the less likely it is to freeze. Finally, the presence of dry gas in pipe 33 helps to evaporate or sublimate any liquid or frozen liquid remaining after the purging process.

When it is no longer desired to purge the liquid from pipe 33 with gas, valve 47 can be manually closed to prevent the charging of reservoir 37. Valves on gas conduits 38 and 42 could also be used to prevent the cyclical opening and closing of valves 39 and 43.

Other means for achieving the same results as described above are readily apparent to those skilled in the art. For example, if the actuation of each of the valves were reversed and the charging of gas to conduits 30, 38 and 42 was also reversed, the result would be the same. Also, if power means such as electricity were available, the valves could be actuated by these means. However, alternate power sources are usually not available at gas well separators and this invention is particularly adapted to this use.

Thus, the present invention is well adapted to attain the objects and advantages mentioned as well as those inherent therein. While presently preferred embodiments of the invention have been described for the purpose of this invention, numerous changes in construction and arrangement of parts can be made by those skilled in the art, which changes are encompassed in the spirit of this invention as defined by the appended claims.

The foregoing disclosure and the showings made in the drawings are merely illustrative of the principles of this invention and are not to be interpreted in a limiting sense.

What is claimed is:

1. A device for use with a separator tank system of the type having a gas and liquid separator tank connected to a holding tank by a holding tank conduit, a gas actuated main valve on the holding tank conduit regulating the flow of liquid therethrough and responsive to gas pressure in a main valve gas conduit, and a liquid level valve responsive to the liquid level in the separator tank for regulating gas pressure in the main valve gas conduit for opening and closing said main valve, the device comprising:

a gas reservoir for holding a quantity of pressurized gas;

means for filling said gas reservoir with a supply of pressurized gas when said main valve is open and liquid is passing from said separator tank to said holding tank in response to a first position of said liquid level valve; and means for discharging said pressurized gas in said gas reservoir into the holding tank conduit between the main valve and the holding tank when the main valve is closed in response to a second position of said liquid level valve such that the holding tank conduit between said main valve and said holding tank is substantially cleared of liquid.

2. The device of claim 1, wherein said filling means comprises:
   a first conduit connecting said gas reservoir to a supply of pressurized gas; and
   a first valve means disposed along said first conduit and connected to the main valve gas conduit such that said first valve means is actuated by the gas pressure in said main valve gas conduit.

3. The device of claim 1, wherein said discharging means comprises:
   a second conduit connecting said gas reservoir to the holding tank conduit; and
   a second valve means disposed along said second conduit and connected to the main valve conduit such that said second valve means is actuated by gas pressure in the main valve gas conduit.

4. The device of claim 1, which further comprises a check valve disposed on said second conduit between the holding tank conduit and said second valve means.

5. The device of claim 1, wherein said gas reservoir is sized such that the pressurized gas discharged from said gas reservoir is approximately the amount necessary to purge the holding tank conduit of liquid.

6. An improved gas well separator of the type having a gas and liquid separator tank connected to a liquid holding tank by a holding tank conduit, a main valve on the holding tank conduit regulating the flow of liquid through the holding tank conduit, the main valve being a gas actuated valve which receives pressurized gas for actuation through a main valve gas conduit, the main valve gas conduit having a regulator responsive to the liquid level in the separator tank for regulating the flow of liquid through the main valve, the improvement comprising:
   a gas reservoir for holding a quantity of gas;
   a first conduit connecting said gas reservoir to a supply of pressurized gas;
   a first valve means disposed along said first conduit and responsive to the liquid level in the separator tank such that as the gas actuated main valve is opened, said first valve means is opened to supply gas to said gas reservoir and as said gas actuated main valve is closed said first valve means is closed to halt the flow of gas to said gas reservoir;
   a second conduit connecting said gas reservoir to the holding tank conduit between the gas actuated main valve and the liquid holding tank; and
   a second valve means responsive to the liquid level in the separator tank such that as the gas actuated main valve is opened said second valve means is closed to isolate said gas reservoir from said holding tank conduit and as said gas actuated main valve is closed said second valve means is opened to communicate said gas reservoir with said holding tank conduit for purging said holding tank conduit of liquid.

7. The device of claim 6, which further comprises a check valve disposed on said second conduit to prevent flow from said holding tank conduit toward said second valve means.

8. The device of claim 6, wherein said first valve means comprises a gas-pressure responsive valve connected to said main valve gas conduit for receiving actuating gas.

9. The device of claim 6, wherein said gas reservoir is sized such that the pressurized gas in said gas reservoir will be approximately the amount required to purge the holding tank conduit of liquid between the main valve and the holding tank.

10. The device of claim 6, which further comprises:
    means for isolating the supply of pressurized gas and said holding tank conduit disposed along said first and second conduits.

11. The device of claim 10, wherein said isolating means comprises a hand-actuated valve disposed on said first conduit between said first valve means and said reservoir.

12. A method to prevent freezing of a dump line on a gas well separator of the type having a float valve responsive to the liquid level in a separator tank which actuates a dump line valve to regulate the flow of liquid from the separator tank to the holding tank, comprising the steps of:
    filling a gas reservoir connected between a source of pressurized gas and said dump line with pressurized gas while the dump line valve is open and liquid is being transferred from said separator tank to the holding tank in response to a first position of said float valve; and
    after the dump line valve is closed, discharging said pressurized gas in the gas reservoir into said dump line between the dump line valve and the holding tank to clear the dump line of liquid in response to a second position of said float valve such that liquid is not stagnant in the dump line and prone to freeze.

* * * * *